United States Patent
Lecomte

(10) Patent No.: US 8,476,175 B2
(45) Date of Patent: Jul. 2, 2013

(54) GLASS STRANDS AND COMPOSITES HAVING AN ORGANIC AND/OR INORGANIC MATRIX CONTAINING SAID STRANDS

(75) Inventor: Emmanuel Lecomte, Aulnay Sous Bois (FR)

(73) Assignee: Saint-Gobain Adfors, Courbevoie (FR)

( * ) Notice: Subject to any disclaimer, the term of this patent is extended or adjusted under 35 U.S.C. 154(b) by 333 days.

(21) Appl. No.: 12/989,225

(22) PCT Filed: Apr. 22, 2009

(86) PCT No.: PCT/FR2009/050748
§ 371 (c)(1),
(2), (4) Date: Oct. 22, 2010

(87) PCT Pub. No.: WO2009/138661
PCT Pub. Date: Nov. 19, 2009

(65) Prior Publication Data
US 2011/0039681 A1 Feb. 17, 2011

(30) Foreign Application Priority Data
Apr. 23, 2008 (FR) ...................... 08 52716

(51) Int. Cl.
*C03C 13/06* (2006.01)
*D02G 3/02* (2006.01)

(52) U.S. Cl.
USPC ........... 501/36; 501/35; 501/70; 57/240; 57/241; 57/242; 57/249; 442/348; 428/364; 428/365; 428/375

(58) Field of Classification Search
USPC ............ 501/35, 36, 70; 57/240, 241, 242, 57/249; 442/348; 428/364, 365, 375
See application file for complete search history.

(56) References Cited

U.S. PATENT DOCUMENTS

| | | | | |
|---|---|---|---|---|
| 3,876,481 | A | * | 4/1975 | Erickson et al. ............ 501/38 |
| 3,892,581 | A | * | 7/1975 | Burgman et al. ............ 501/38 |
| 3,902,881 | A | * | 9/1975 | Pirooz ................. 65/30.13 |
| 3,945,838 | A | | 3/1976 | Erickson et al. |
| 2007/0087139 | A1 | | 4/2007 | Creux et al. |
| 2010/0093511 | A1 | | 4/2010 | Berthereau et al. |
| 2010/0184345 | A1 | * | 7/2010 | Lalande et al. ............ 442/1 |

FOREIGN PATENT DOCUMENTS

| | | |
|---|---|---|
| FR | 2916438 A1 * | 11/2008 |
| GB | 1 209 244 | 10/1970 |
| WO | WO 02/42233 A2 | 5/2002 |
| WO | WO 2006/064164 A1 | 6/2006 |

* cited by examiner

*Primary Examiner* — Karl Group
*Assistant Examiner* — Elizabeth A Bolden
(74) *Attorney, Agent, or Firm* — Oblon, Spivak, McClelland, Maier & Neustadt, L.L.P.

(57) ABSTRACT

The invention relates to glass strands especially for the production of composites having an organic and/or inorganic matrix, the composition of which strands comprises the following constituents in the limits defined below, expressed as percentages by weight:

| | |
|---|---|
| $SiO_2$ | 50-65% |
| $Al_2O_3$ | 12-23% |
| $SiO_2 + Al_2O_3$ | >79% |
| CaO | 1-10% |
| MgO | 6-12% |
| $Li_2O$ | 1-3%, preferably 1-2% |
| BaO + SrO | 0-3% |
| $B_2O_3$ | 0-3% |
| $TiO_2$ | 0-3% |
| $Na_2O + K_2O$ | <2% |
| $F_2$ | 0-1% |
| $Fe_2O_3$ | <1%. |

These strands are made of a glass offering an excellent compromise between its mechanical properties, represented by the specific Young's modulus, and its melting and fiberizing conditions.

18 Claims, No Drawings

GLASS STRANDS AND COMPOSITES HAVING AN ORGANIC AND/OR INORGANIC MATRIX CONTAINING SAID STRANDS

This application is a National Stage of PCT/FR09/050748 filed Apr. 22, 2009 and claims the benefit of FR 0852716 filed Apr. 23, 2008.

The present invention relates to glass strands (or "fibers"), especially textile strands, which can be obtained by the process that consists in mechanically attenuating streams of molten glass that flow out of orifices located in the base of a bushing, which is generally heated by resistance heating. These glass strands are intended especially for the production of meshes and fabrics used in composites having an organic and/or inorganic matrix.

The present invention relates more specifically to glass strands having a high specific Young's modulus and having a particularly advantageous quaternary composition of the $SiO_2$—$Al_2O_3$—$CaO$—$MgO$ type.

The field of glass strands that can be employed for the manufacture of such composites is a very special field in the glass industry. These strands are produced from specific glass compositions, the glass used having to be able to be drawn into the form of filaments a few microns in diameter using the process indicated above and having to allow the formation of continuous strands capable of improving the mechanical properties of the aforementioned organic and/or inorganic matrices.

In certain applications, especially in aeronautics, the aim is to obtain large components capable of operating under dynamic conditions and consequently capable of withstanding high mechanical stresses. These components are usually based on organic and/or inorganic materials and on a reinforcement, for example in the form of glass strands, which in general occupies more than 50% of the volume.

The mechanical properties and the effectiveness of such composite parts are improved by improving the mechanical performance of the glass strands, especially the specific Young's modulus.

In other applications associated with the construction industry, it is for example usual to employ glass strands, especially in the form of a mesh, to increase the crack resistance of building wall renders. The desired properties in this case are good mechanical strength of the glass strand and high dimensional stability of the mesh.

The properties of the glass reinforcement strands in particular are mainly governed by the composition of their constituent glass. The glass strands most widely used in composites based on organic and/or inorganic materials consist of E-glass or R-glass.

In composites, E-glass strands are usually employed either as such, advantageously after having undergone a twisting operation (textile yarns), or in the form of organized assemblies such as fabrics. The conditions under which E-glass can be fiberized are highly advantageous—the working temperature corresponding to the temperature at which the glass has viscosity close to 1000 poise is relatively low, of around 1200° C., the liquidus temperature is about 120° below the working temperature, and its devitrification rate is low.

The composition of E-glass defined in the ASTM D 578-98 standard for applications in the fields of electronics and aeronautics is the following (in percentages by weight): 52 to 56% $SiO_2$; 12 to 16% $Al_2O_3$; 16 to 25% CaO; 5 to 10% $B_2O_3$; 0 to 5% MgO; 0 to 2% $Na_2O+K_2O$; 0 to 0.8% $TiO_2$; 0.05 to 0.4% $Fe_2O_3$; and 0 to 1% $F_2$.

However, bulk E-glass has a relatively low specific Young's modulus, of around 33 MPa/kg/m³.

The ASTM D 578-98 standard describes other E-glass reinforcement strands, optionally the glass containing no boron. These strands having the following composition (in percentages by weight): 52 to 62% $SiO_2$; 12 to 16% $Al_2O_3$; 16 to 25% CaO; 0 to 10% $B_2O_3$; 0 to 5% MgO; 0 to 2% $Na_2O+K_2O$, 0 to 1.5% $TiO_2$; 0.05 to 0.8% $Fe_2O_3$; and 0 to 1% $F_2$.

The fiberizing conditions for boron-free E-glass are less favourable than those for E-glass containing boron, but they do remain, however, economically acceptable. The specific Young's modulus remains at a performance level equivalent to that of E-glass.

Also known, from U.S. Pat. No. 4,199,364, is an inexpensive glass, containing neither boron nor fluorine, which has mechanical properties, especially a tensile strength, comparable to those of E-glass.

In bulk, R-glass is known for its good mechanical properties, especially as regards the specific Young's modulus, which is around 33.5 MPa/kg/m³. However, the melting and fiberizing conditions are more constrictive than in the case of the abovementioned types of E-glass, and therefore the final cost of R-glass is higher.

The composition of R-glass is given in FR-A-1 435 073, this being the following (in percentages by weight): 50 to 65% $SiO_2$; 20 to 30% $Al_2O_3$; 2 to 10% CaO, 5 to 20% MgO; 15 to 25% CaO+MgO; $SiO_2/Al_2O_3$=2 to 2.8; $MgO/SiO_2$<0.3.

Other attempts at increasing the mechanical strength of glass strands have been made, but generally to the detriment of their fiberizability, the processing then becoming more difficult or imposing the need to modify existing fiberizing installations.

The glass strands described in FR 1 357 393 fall within this category: they have a very high resistance to high temperatures (815° C. or higher) and particularly advantageous mechanical properties, especially a tensile strength exceeding 35000 kg/cm². However, the conditions for obtaining such strands are very constraining, requiring in particular a temperature at the bushing of at least 1475° C., which may be up to 1814° C. These conditions preclude direct fiberizing from molten glass produced in a furnace, only indirect fiberizing from glass in the form of beads being possible.

In FR-A-2 856 055, the Applicant has proposed glass strands that combine the mechanical properties of R-glass, in particular the specific Young's modulus, and improved melting and fiberizing conditions close to those of E-glass. The glass making up these strands comprises the following constituents in the limits defined below, expressed as percentages by weight: 50 to 65% $SiO_2$; 12 to 20% $Al_2O_3$; 13 to 17% CaO; 6 to 12% MgO; 0 to 3% $B_2O_3$; 0 to 3% $TiO_2$; less than 2% $Na_2O+K_2O$; 0 to 1% $F_2$ and less than 1% $Fe_2O_3$.

In FR-A-2 879 591, the aforementioned glass strand composition is improved by the addition of 0.1 to 0.8% of $Li_2O$ and the choice of the CaO/MgO ratio, which is less than or equal to 2 and preferably equal to or greater than 1.3.

The object of the present invention is to obtain filaments consisting of a glass having a high specific Young's modulus that can be manufactured under the usual conditions for direct fiberizing, which especially require a glass having a liquidus temperature of at most 1250° C. and preferably at most 1230° C.

This object is achieved thanks to glass strands whose composition comprises the following constituents in the limits defined below, expressed as percentages by weight:

| | |
|---|---|
| $SiO_2$ | 50-65% |
| $Al_2O_3$ | 12-23% |

| | |
|---|---|
| $SiO_2 + Al_2O_3$ | >79% |
| CaO | 1-10% |
| MgO | 6-12% |
| $Li_2O$ | 1-3%, preferably 1-2% |
| BaO + SrO | 0-3% |
| $B_2O_3$ | 0-3% |
| $TiO_2$ | 0-3% |
| $Na_2O + K_2O$ | <2% |
| $F_2$ | 0-1% |
| $Fe_2O_3$ | <1%. |

Silica ($SiO_2$) is one of the oxides that forms the network of the glasses according to the invention and plays an essential role in their stability. Within the context of the invention, when the silica content is less than 50%, the viscosity of the glass becomes too low and there is an increased risk of devitrification during fiberizing. Above 65%, the glass becomes very viscous and difficult to melt. Preferably, the silica content is between 58% and 63%.

Alumina ($Al_2O_3$) also constitutes a network former for the glasses according to the invention and plays an essential role with regard to the modulus, combined with silica. Within the context of the defined limits according to the invention, reducing the percentage concentration of this oxide to below 12% results in a reduction in the specific Young's modulus and contributes to increasing the maximum devitrification rate, whereas too large an increase in the percentage concentration of this oxide, to above 23%, runs the risk of devitrification and increases the viscosity. Preferably, the alumina content of the selected compositions lies in the range from 18 to 23%. Advantageously, the sum of the silica and alumina contents is greater than 80% and better still greater than 81%, which makes it possible to achieve advantageous values of the specific Young's modulus.

Lime (CaO) is used to adjust the viscosity and to control the devitrification of the glasses. The CaO content in the strands according to the invention is an essential feature. It is between 1 and 10%, preferably equal to or greater than 3%, advantageously equal to or greater than 5% and better still equal to or greater than 6%. Particularly advantageously, the CaO content is less than or equal to 9% and better still less than or equal to 8%.

Magnesia (MgO), like CaO, acts as a viscosity reducer and also has a beneficial effect on the specific Young's modulus. The MgO content lies in the range from 6 to 12%, preferably from 9 to 12%.

The CaO/MgO weight ratio has an influence on the specific Young's modulus and on the liquidus temperature of the glass. For a given alumina content, reducing the CaO/MgO ratio has the effect of increasing the specific Young's modulus. Preferably, the CaO/MgO ratio varies from 0.5 to 1.3 and advantageously from 0.7 to 1.1.

Other alkaline-earth metal oxides, for example BaO and SrO, may be present in the glass composition. The total content of these oxides is kept below 3%, preferably below 1%, so as not to increase the density of the glass, which would have the effect of lowering the specific Young's modulus. As a general rule, the composition contains substantially no BaO and SrO.

Lithium oxide ($Li_2O$) is essential for obtaining a high specific Young's modulus. It also acts, just like MgO, as a viscosity reducer. Above 3%, $Li_2O$ results in a substantial reduction in the working temperature, and therefore in the forming range (the difference between the working temperature and the liquidus temperature), which would no longer allow the glass to be fiberized satisfactorily. Below 1%, the reduction in working temperature is insufficient.

$Li_2O$ is essentially provided by two raw materials, one synthetic, namely lithium carbonate, and the other natural, namely spodumene which contains only 7 to 8% $Li_2O$.

The composition of the glass constituting the filaments according to the invention is based on the choice of the $Al_2O_3$ content, the CaO/MgO ratio and the $Li_2O$ content. The combination of these three parameters makes it possible to obtain very satisfactory specific Young's modulus values (of greater than 36.5 $MPa/kg/m^3$) while still having good fiberizability.

Boron oxide ($B_2O_3$) acts as a viscosity reducer. Its content in the glass composition according to the invention is limited to 3%, preferably 2%, in order to avoid problems of volatilization and emission of pollutants.

Titanium oxide acts as a viscosity reducer and helps to increase the specific Young's modulus. It may be present as an impurity (its content in the composition is then from 0 to 1%) or it may be intentionally added. However, its intentional addition requires the use of non-standard raw materials that are more expensive. Preferably, the $TiO_2$ content is less than 2%, advantageously less than 1%, so as to avoid the glass taking on an undesirable yellow color.

$Na_2O$ and $K_2O$ may be introduced into the composition according to the invention in order to contribute to limiting devitrification and possibly to reduce the viscosity of the glass. However, the content of $Na_2O$ and $K_2O$ must remain below 2% in order to avoid jeopardizing the hydrolytic resistance of the glass. Preferably, the composition contains less than 0.8% of these two oxides.

Fluorine ($F_2$) may be present in the composition in order to help in glass melting and in fiberizing. However, its content is limited to 1%, as above this there may be the risk of polluting emissions and of corrosion of the furnace refractories.

Iron oxides (expressed in $Fe_2O_3$ form) are generally present as impurities in the composition according to the invention. The $Fe_2O_3$ content must be below 1%, preferably equal to 0.5% or less, in order not to unacceptably impair the color of the strands and the operation of the fiberizing installation, in particular heat transfers in the furnace.

Preferably, the glass strands have a composition comprising the following constituents in the limits defined below, expressed in percentages by weight:

| | |
|---|---|
| $SiO_2$ | 58-63% |
| $Al_2O_3$ | 18-23% |
| $SiO_2 + Al_2O_3$ | >79% |
| CaO | 5-9%, preferably 6-8% |
| MgO | 9-12% |
| $Li_2O$ | 1-2% |
| BaO + SrO | 0-1% |
| $B_2O_3$ | 0-2% |
| $TiO_2$ | 0-1% |
| $Na_2O + K_2O$ | <0.8% |
| $F_2$ | 0-1% |
| $Fe_2O_3$ | <0.5%. |

It is particularly advantageous for the composition to have an $Al_2O_3/(Al_2O_3+CaO+MgO)$ weight ratio that ranges from 0.4 to 0.7, preferably from 0.5 to 0.6, thereby making it possible to obtain glasses that have a liquidus temperature of 1250° C. or below, preferably of 1230° C. or below.

As a general rule, the glass strands according to the invention contain no boron oxide $B_2O_3$ or fluorine $F_2$.

The glass strands according to the invention are obtained from the glasses of the composition described above using the following process: a large number of streams of molten glass flowing out of a large number of orifices located in the base of one or more bushings are attenuated into the form of one or more sheets of continuous filaments and then these filaments are combined into one or more strands, which are collected on a moving support. This may be a rotating support, when the strands are collected in the form of wound packages, or in the form of a support that moves translationally when the strands are chopped by a device that also serves to draw them or when the strands are sprayed by a device serving to draw them, so as to form a mat.

The strands obtained, optionally after further conversion operations, may thus be in various forms: continuous strands, chopped strands, woven fabrics, knitted fabrics, braids, tapes or mats, these strands being composed of filaments whose diameter may range from about 5 to 30 microns. Preferably, the strand is a textile strand that has undergone a twisting operation.

The molten glass feeding the bushings is obtained from pure raw materials or, more usually, natural raw materials (that is to say possibly containing trace impurities), these raw materials being mixed in appropriate proportions, and then melted. The temperature of the molten glass is conventionally regulated so as to allow it to be fiberized and to avoid devitrification problems. Before the filaments are combined in the form of strands, they are generally coated with a size composition with the aim of protecting them from abrasion and allowing them to be subsequently incorporated into the materials to be reinforced.

The composites obtained from the strands according to the invention comprise at least one organic material and/or at least one inorganic material and glass strands, at least some of the strands being the strands according to the invention.

The glass strands according to the invention may be used in any type of application and their use is not limited to the aeronautical and construction fields mentioned above. In particular, said strands may be used to manufacture products obtained by lamination.

The following examples illustrate the invention without however limiting it.

Glass strands made up of glass filaments 13 μm in diameter were obtained by attenuating molten glass having the composition given in Table 1, expressed in percentages by weight.

The temperature at which the viscosity of the glass is equal to $10^3$ poise (decipascals.second) is denoted by $T(\log \eta = 3)$.

The liquidus temperature of the glass is denoted by $T_{liquidus}$, this temperature corresponding to that at which the most refractory phase that can devitrify in the glass has a zero growth rate and thus corresponds to the melting point of this devitrified phase.

The value of the specific Young's modulus of the glass in bulk calculated from the Young's modulus measured according to the ASTM C 1259-01 standard and from the density measured by the Archimedes method. As comparative examples, Table 1 gives the measurements for E-glass, R-glass and S-glass (in accordance with Example 1 of FR 1 357 393) and a glass according to FR 2 879 591 (Comparative Example 1).

It appears that the examples according to the invention exhibit an excellent compromise between melting and fiberizing properties and mechanical properties. These fiberizing properties are particularly advantageous, especially with a liquidus temperature of around 1210° C. to 1230° C., which is markedly lower than that of R-glass and S-glass. The fiberizing range of Examples 1 to 4 is positive, with a difference between $T(\log \eta=3)$ and $T_{liquidus}$ which is equal to or greater than 60° C. (Example 4), 70° C. (Example 1) or 80° C. (Example 2) or around 90° C. (Example 3).

The specific Young's modulus of the glass obtained from the compositions according to Examples 1 and 2 is markedly higher than that of E-glass and also improved over that of R-glass and the glass of Comparative Example 1.

Remarkably, with the glasses according to the invention, substantially better mechanical properties than those of R-glass are thus achieved, while appreciably lowering the fiberizing temperature, bringing it close to the value obtained for E-glass. The glasses of Examples 1 to 4 constitute an excellent alternative to S-glass owing to the very substantial reduction in the liquidus temperature (220° C., 230° C. and 210° C. respectively) and in the working temperature (179° C., 165° C., 172° C. and 176° C. respectively) while maintaining a relatively high specific Young's modulus.

The glass strands according to the invention also have a better water resistance and alkali resistance than E-glass.

The glass strands according to the invention are less expensive than R-glass strands, which may advantageously be replaced in all applications, especially those using textile strands.

TABLE 1

|  | Ex. 1 | Ex. 2 | Ex. 3 | Ex. 4 | E-glass (comparative glass) | R-glass (comparative glass) | S-glass (comparative glass) | Comparative Ex. 1 |
|---|---|---|---|---|---|---|---|---|
| $SiO_2$ (%) | 60.50 | 60.90 | 60.60 | 60.20 | 54.40 | 60.00 | 65.00 | 60.50 |
| $Al_2O_3$ (%) | 19.90 | 18.30 | 20.50 | 21.50 | 14.50 | 25.00 | 25.00 | 16.00 |
| CaO (%) | 7.70 | 8.30 | 6.80 | 5.80 | 21.20 | 9.00 | — | 13.50 |
| MgO (%) | 9.50 | 10.00 | 9.30 | 9.30 | 0.30 | 6.00 | 10.00 | 8.35 |
| $Na_2O$ (%) | 0.20 | — | 0.20 | 0.20 | 0.60 | — | — | — |
| $K_2O$ (%) | 0.50 | — | 0.50 | 0.50 | — | — | — | — |
| $Li_2O$ (%) | 1.40 | 1.30 | 1.65 | 2.00 | 7.30 | — | — | 0.75 |
| $TiO_2$ (%) | 0.13 | — | 0.17 | 0.10 | — | — | — | — |
| $Fe_2O_3$ (%) | — | — | 0.20 | 0.20 | — | — | — | — |
| CaO/MgO | 0.81 | 0.83 | 0.73 | 0.62 | 70.66 | 1.5 | 0 | 1.61 |
| $T(\log \eta = 3)$ (° C.) | 1293 | 1307 | 1300 | 1296 | 1203 | 1410 | 1472 | 1279 |
| $T_{liquidus}$ (° C.) | 1220 | 1220 | 1210 | 1230 | 1080 | 1330 | 1440 | 1200 |
| $T(\log \eta = 3) - T_{liquidus}$ (° C.) | 73 | 87 | 90 | 66 | 123 | 80 | 32 | 79 |
| Specific Young's modulus (MPa/kg/m$^3$) | 36.7 | 36.5 | 36.7 | 36.9 | 33.3 | 35.5 | 37.4 | 35.6 |
| DGG (mg) | n.d. | 6.9 | — | — | 8.0 | 3.3 | n.d. | n.d. |
| Alkalinity (mg) | n.d. | 1.2 | — | — | 1.4 | 0.4 | n.d. | n.d. | n.d.: not determined

The invention claimed is:

1. A glass strand comprising a composition with limits defined below expressed as percent by weight:

| | |
|---|---|
| $SiO_2$ | 58-63% |
| $Al_2O_3$ | 18-23% |
| $SiO_2 + Al_2O_3$ | >79% |
| CaO | 5-9% |
| MgO | 9-12% |
| $Li_2O$ | 1-2% |
| BaO + SrO | 0-1% |
| $B_2O_3$ | 0-2% |
| $TiO_2$ | 0-1% |
| $Na_2O + K_2O$ | <0.8% |
| $F_2$ | 0-1% |
| $Fe_2O_3$ | <0.5%. |

2. The glass strand of claim 1, comprising no $B_2O_3$ or $F_2$.

3. An assembly of glass strands, wherein the glass strands comprise one or more glass strands of claim 1.

4. A composite comprising glass strands and at least one material selected from the group consisting of an organic material and an inorganic material, wherein the glass strands comprise one or more glass strands as defined in claim 1.

5. A glass composition suitable for producing the glass strand of claim 1, comprising in limits defined below, expressed as percentages by weight:

| | |
|---|---|
| $SiO_2$ | 58-63%; |
| $Al_2O_3$ | 18-23%; |
| $SiO_2 + Al_2O_3$ | >79%; |
| CaO | 5-9%; |
| MgO | 9-12%; |
| $Li_2O$ | 1-2%; |
| BaO + SrO | 0-1%; |
| $B_2O_3$ | 0-2%; |
| $TiO_2$ | 0-1%; |
| $Na_2O + K_2O$ | <0.8%; |
| $F_2$ | 0-1%; and |
| $Fe_2O_3$ | <0.5%. |

6. The composition of claim 5, having a forming range, $T(\log \eta = 3) - T_{liquidus}$, equal to or greater than 60° C.

7. The glass strand of claim 1, in that the composition has a $SiO_2 + Al_2O_3$ content of greater than 81%.

8. An assembly of glass strands, wherein the glass strands comprise one or more of glass strands of claim 7.

9. A composite comprising glass strands and at least one material selected from the group consisting of an organic material and an inorganic material, wherein the glass strands comprise one or more glass strands as defined in claim 7.

10. The glass strand of claim 1, wherein the composition has a CaO content equal to or greater than 6%.

11. An assembly of glass strands, wherein the glass strands comprise one or more of glass strands of claim 10.

12. A composite comprising glass strands and at least one material selected from the group consisting of an organic material and an inorganic material, wherein the glass strands comprise one or more glass strands as defined in claim 10.

13. The glass strand of claim 1, wherein the CaO content is equal to or less than 8%.

14. An assembly of glass strands, wherein the glass strands comprise one or more of glass strands of claim 13.

15. A composite comprising glass strands and at least one material selected from the group consisting of an organic material and an inorganic material, wherein the glass strands comprise one or more glass strands as defined in claim 13.

16. The glass strand of claim 1, wherein the composition has an $Al_2O_3/(Al_2O_3 + CaO + MgO)$ weight ratio that ranges from 0.5 to 0.6.

17. An assembly of glass strands, wherein the glass strands comprise one or more of glass strands of claim 16.

18. A composite comprising glass strands and at least one material selected from the group consisting of an organic material and an inorganic material, wherein the glass strands comprise one or more glass strands as defined in claim 16.

* * * * *